United States Patent
Ali et al.

(10) Patent No.: US 7,379,538 B1
(45) Date of Patent: May 27, 2008

(54) TELEPHONE ANSWERING DEVICE WHICH NOTIFIES A USER BASED ON CALL RELATED INFORMATION RECEIVED FROM A CALLING PARTY

(75) Inventors: Syed S. Ali, Allentown, PA (US); Charles W. Berthoud, Nazareth, PA (US); Mohd M. Hobbi, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/325,423

(22) Filed: Jun. 4, 1999

(51) Int. Cl.
 *H04M 1/64* (2006.01)
 *H04M 1/56* (2006.01)
 *H04M 15/06* (2006.01)

(52) U.S. Cl. .............. 379/88.12; 379/142.04

(58) Field of Classification Search ............. 379/88.11, 379/88.12, 88.19, 88.2, 88.22, 88.23, 211.02, 379/212.02, 266.03, 88.25, 142.04, 142.06, 379/142.07; 455/458–460
See application file for complete search history.

(56) References Cited

U.S. PATENT DOCUMENTS

| | | | | |
|---|---|---|---|---|
| 5,276,731 A * | 1/1994 | Arbel et al. | ........... | 379/100.13 |
| 5,504,805 A * | 4/1996 | Lee | ........... | 379/88.03 |
| 5,524,140 A * | 6/1996 | Klausner et al. | ........... | 379/88.11 |
| 5,905,774 A * | 5/1999 | Tatchell et al. | ........... | 379/88.04 |
| 5,946,386 A * | 8/1999 | Rogers et al. | ........... | 379/265.09 |
| 5,991,365 A * | 11/1999 | Pizano et al. | ........... | 379/88.13 |
| 5,995,603 A * | 11/1999 | Anderson | ........... | 379/142.05 |
| 6,005,870 A * | 12/1999 | Leung et al. | ........... | 370/466 |
| 6,061,570 A * | 5/2000 | Janow | ........... | 455/458 |
| 6,160,877 A * | 12/2000 | Tatchell et al. | ........... | 379/197 |
| 6,266,400 B1 * | 7/2001 | Castagna | ........... | 379/265.09 |
| 6,292,543 B1 * | 9/2001 | Cannon et al. | ........... | 379/67.1 |
| 6,415,026 B1 * | 7/2002 | Flood | ........... | 379/215.01 |
| 6,445,694 B1 * | 9/2002 | Swartz | ........... | 370/352 |
| 6,493,431 B1 * | 12/2002 | Troen-Krasnow et al. | ........... | 379/88.12 |
| 6,496,568 B1 * | 12/2002 | Nelson | ........... | 379/88.12 |
| 6,522,736 B1 * | 2/2003 | Toyoda et al. | ........... | 379/142.17 |
| 6,553,221 B2 * | 4/2003 | Nakamura et al. | ........... | 455/415 |
| 6,560,318 B1 * | 5/2003 | Spielman et al. | ........... | 379/88.12 |
| 6,580,784 B2 * | 6/2003 | Rodriguez et al. | ........... | 379/88.12 |
| 6,621,894 B2 * | 9/2003 | Fujino et al. | ........... | 379/142.06 |
| 2001/0012347 A1 * | 8/2001 | Fujino et al. | ........... | 379/142.06 |

* cited by examiner

*Primary Examiner*—Fan Tsang
*Assistant Examiner*—Joseph T Phan

(57) ABSTRACT

Apparatus and processes to provide notification to a remote user upon the occurrence of a qualifying event determined by a voice messaging system based on logged call related information, e.g., Caller ID information. A return call data directory table is maintained associating predetermined events based on logged call related information with a telephone number to be called in the event of the satisfaction of a designated event. Designated events may include a predetermined number of calls from a particular caller within a predetermined range of time or days, or a total number of calls from any caller within a predetermined range of time. An auto dialing calling module automatically dials a designated or default telephone number to notify the user of the satisfaction of the designated event. A notification message is played to the remote user, and the user is either informed of the details of the satisfied event and/or is allowed to playback voice messages or otherwise control the operation of the voice messaging system. The user may add, delete or modify any of the entries in the return call data directory table either local to the voice messaging system or from a remote location through an established telephone call.

24 Claims, 4 Drawing Sheets

| CALLER ID DATA RECEIVED | NUMBER OF TIMES CALLER ID DATA RECEIVED FOR NUMBER | NOTIFY OTHER PARTIES ? | TELEPHONE NUMBER TO BE NOTIFIED | |
|---|---|---|---|---|
| 888-555-1212 | 1 | YES | 888-555-1414 | —202 |
| 800-555-0000 | 1 | NO | – | —204 |
| SMITH | 2 | YES | 888-555-1515 | —206 |
| 800-555-1717 | 1 | YES | DEFAULT | —208 |
| 888-555-1616 | 1 | YES | DEFAULT | —210 |
| 888-555-1818 | 1 | NO | – | —212 |
| ETC. | ETC. | ETC. | ETC. | |
| ○ ○ ○ | ○ ○ ○ | ○ ○ ○ | ○ ○ ○ | |
| (DEFAULT) | 10 OVER LAST HOUR | YES | (888) 555-1234 | —218 |

| CALLER ID DATA RECEIVED | NUMBER OF TIMES CALLER ID DATA RECEIVED FOR NUMBER | NOTIFY OTHER PARTIES ? | TELEPHONE NUMBER TO BE NOTIFIED | |
|---|---|---|---|---|
| 888-555-1212 | 1 | YES | 888-555-1414 | 202 |
| 800-555-0000 | 1 | NO | - | 204 |
| SMITH | 2 | YES | 888-555-1515 | 206 |
| 800-555-1717 | 1 | YES | DEFAULT | 208 |
| 888-555-1616 | 1 | YES | DEFAULT | 210 |
| 888-555-1818 | 1 | NO | - | 212 |
| ETC. | ETC. | ETC. | ETC. | |
| ○○○ | ○○○ | ○○○ | ○○○ | |
| (DEFAULT) | 10 OVER LAST HOUR | YES | (888) 555-1234 | 218 |

Columns: 220, 222, 224, 226

TELEPHONE ANSWERING DEVICE WHICH NOTIFIES A USER BASED ON CALL RELATED INFORMATION RECEIVED FROM A CALLING PARTY

BACKGROUND OF THE INVENTION

1. Field of the Invention

This invention relates generally to voice messaging systems. More particularly, it relates to a telephone answering device capable of notifying a user at another telephone number based on call related information received with respect to an incoming telephone call.

2. Background of Related Art

Voice messaging systems in general, and telephone answering devices (i.e., answering machines) in particular, are useful devices for the home or office. A conventional telephone answering device operates on a single telephone line and answers an incoming call to an unused (i.e., on-hook) telephone after a desired number of rings. The telephone answering device causes the telephone line to enter an off-hook condition, then plays an outgoing greeting message to the calling party. After the outgoing greeting message, the calling party may leave a voice message on the telephone answering device. At a later time, the voice message is replayed by the user, either local to the telephone answering device or via remote connection from another telephone.

FIG. 4 illustrates a conventional telephone answering device capable of answering an incoming call on a telephone line.

In FIG. 4, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 may be any suitable processor, e.g., microprocessor, microcontroller, or digital signal processor (DSP). The ring detect signal indicates to the controller 19 the ringing of an incoming telephone call on the telephone line 15.

After a desired number of ring signals, the telephone answering device 11 causes the telephone line interface 17 to place the telephone line in an off-hook state, and instructs a voice recorder/playback audio module 21 to play an outgoing greeting message 43 over the telephone line 15 to the calling party. Upon completion of the outgoing greeting message, the calling party may leave a voice message in voice message memory 23 under the control of the controller 19. A keypad 25 allows the user to select various modes of operation, including the playback of voice messages.

The conventional telephone answering device 11 illustrated in FIG. 4 further includes a call related information (e.g., Calling Identity Delivery (Caller ID)) detector/receiver 27 to detect and receive call related information, e.g., the telephone number and/or household name of a calling party, from the central office over the telephone line 15. The call related information is typically displayed on a display 29 and may be logged in a call related information log 39.

By reviewing the call related information (e.g., Caller ID information) received with the ring signals of an incoming call, the user of the conventional telephone answering device 11 can determine the household name and/or telephone number of the calling party even before the calling party leaves a voice message. Basic call related information such as Caller ID information is typically transmitted from the local telephone company to the telephone answering device 11 of the called party while the called party's telephone answering device 11 and other telephones are in a hung-up or on-hook state, e.g., between the first and second rings.

Oftentimes, it is important or necessary for the user of a telephone answering device or other designated party to be immediately notified when a certain calling party leaves a voice message on the telephone answering system, when a certain number of telephone calls from a particular party have been received by the telephone answering device, or other predetermined event or events. However, with conventional telephone answering devices, the user must continually call in from a remote location to their telephone answering device to determine if any particular caller has called a number of times, etc. Moreover, remote information from a telephone answering device typically includes only voice message information without an analysis of received call related information (i.e., some callers do not always leave a voice message). Unfortunately, conventional telephone answering device do not automatically notify a user or other party upon occurrence of a predetermined event.

SUMMARY OF THE INVENTION

In accordance with the principles of the present invention, a controlling system for a voice messaging system is provided. The controlling system comprises a controller, a calling module, controlled by the controller, and adapted to initiate a telephone call, and a dual tone, multiple frequency (DTMF) generator. The calling module causes said controller to initiate an outgoing call using the DTMF generator upon receipt of predetermined call related information.

A method for notifying a user of a voice messaging system or other designated party upon receipt of a voice message from a calling party in accordance with the present invention comprises recording the voice message of the calling party, disconnecting the calling party from the voice messaging system, initiating a telephone call to the user or other designated party, and playing the recorded voice message to the user or other designated party.

In accordance with another aspect of the present invention, a telephone answering device comprises a controller, a voice recorder/playback module, and a calling module activated by receipt of predetermined call related information causing said controller to initiate a telephone call to a predetermined notification number and playing the recorded voice message.

BRIEF DESCRIPTION OF THE DRAWINGS

Features and advantages of the present invention will become apparent to those skilled in the art from the following description with reference to the drawings, in which:

FIG. 2 illustrates an exemplary return call data directory table shown in FIG. 1.

DETAILED DESCRIPTION OF ILLUSTRATIVE EMBODIMENTS

The present invention provides a technique for notifying a user at a remote location upon the occurrence of a predetermined event or sequence of events, e.g., when a particular party calls one or more times, based on an analysis of call related information received with respect to incoming telephone calls. The analysis can preferably be performed for all incoming telephone calls to the voice messaging system, whether or not the calling party left a voice message on the voice messaging system with any of their respective telephone calls.

Figure 1:
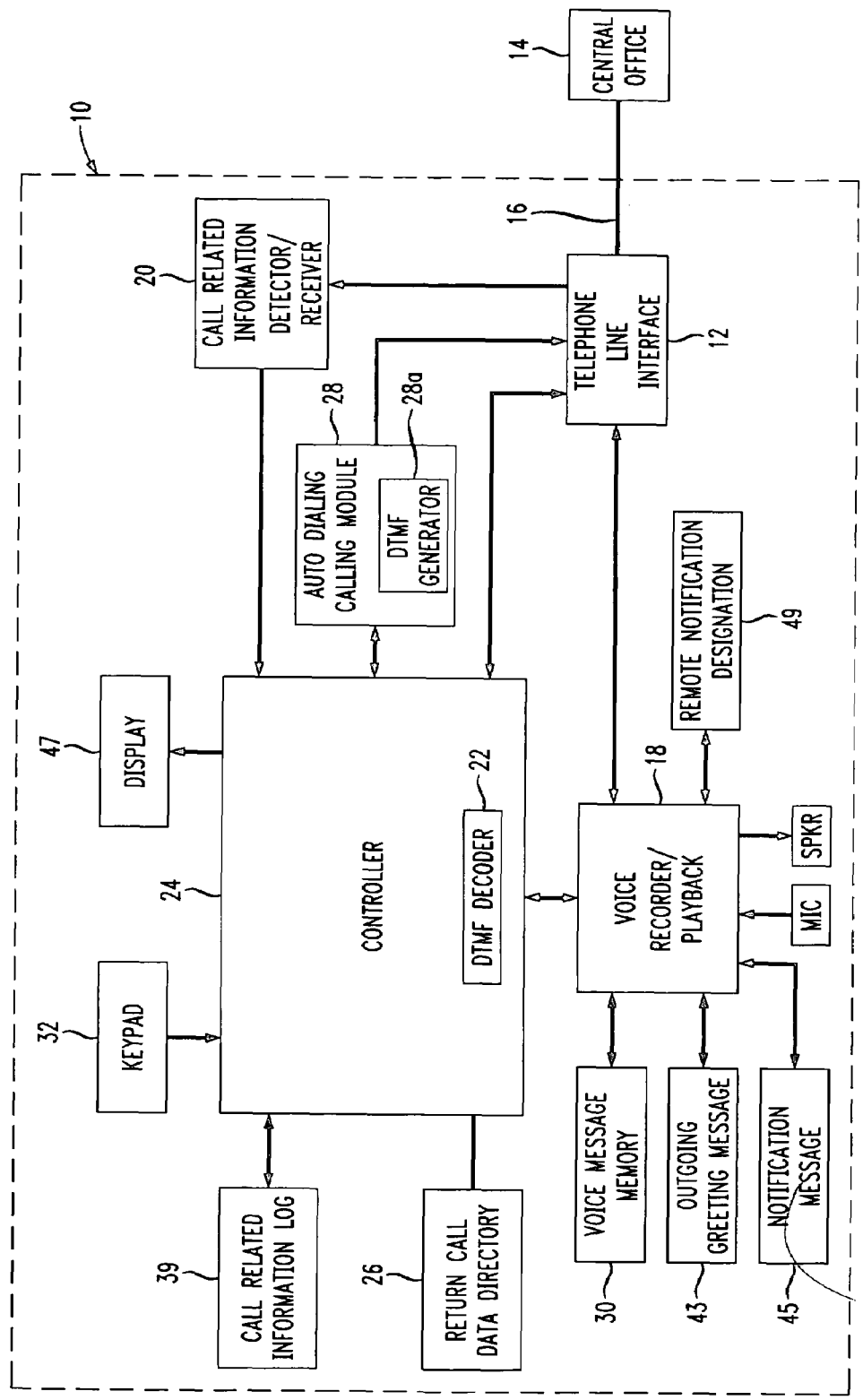
FIG. 1 illustrates a telephone answering device capable of notifying a user or other designated party upon analysis of call related information, in accordance with the principles of the present invention.

FIG. 1 shows an exemplary voice messaging system which automatically notifies a user at a remote location upon the occurrence of a predetermined event in accordance with the principles of the present invention.

In particular, FIG. 1 illustrates a telephone answering device, indicated generally at 10, capable of recording voice messages from calling parties in an otherwise conventional fashion. The telephone answering device 10 includes a telephone line interface 12 for interconnection with a central office 14 via a telephone line 16. The telephone line interface 12 interconnects the telephone line 16 with a voice recorder/playback module 18. A controller 24 controls the overall operation of the telephone answering device 10, and includes a DTMF decoder 22 to allow remote control communications from a remote telephone. An alphanumeric keypad 32 and display 47 provide a user interface for making telephone calls, retrieving, recording and otherwise manipulating voice messages stored in voice message memory 30 and/or outgoing greeting message(s) stored in an outgoing greeting message storage location 43. The keypad 32 and display 47 also allow a user to program variable parameters within the telephone answering device 10, e.g., entries in a return call data directory 26 or for recording a customized notification message 45 as will be described in more detail herein below.

The telephone answering device 10 also includes a conventional call information detector/receiver 20 adapted to detect and receive call related information, e.g., Caller ID information such as a telephone number and/or household name of a calling party. Received call related information may be logged chronologically in a call related information log 39. The call related information detector/receiver 20 communicates with the telephone line 16 via the telephone line interface 12.

The telephone answering device 10 further includes an auto dialing calling module 28. The auto dialing calling module 28 is a procedure operating in the controller 24 which capable of initiating a telephone call to a desired party, and playing the notification message 45 upon answering of the automatically placed call. Preferably, after completion of the notification message 45, the controller 24 enters a monitoring mode wherein it accepts control signals from the remote telephone automatically dialed, e.g., using DTMF touch tones. Thus, after receiving playback of the notification message 45, the user can manipulate the voice messages stored in the voice message memory 30 as desired from the remote telephone.

In the disclosed embodiment, the auto dialing calling module 28 includes a DTMF tone generator 28a, which provides the DTMF touch tone digits of a telephone number designated by the user to be used for notification of a predetermined event.

Additionally, the telephone answering device 10 includes a return call data directory 26. The return call data directory 26 contains a database of entries each associating a predetermined event to particular call related information. For instance, in one embodiment, the return call data directory 26 includes a database associating specific Caller ID information, i.e., the name, the telephone number, etc., of a calling party, with a predetermined event, e.g., the number of times that a particular caller or group of callers may call (i.e., the number of call related information entries bearing a relevant time stamp and stored in the call related information log 39) before automatic notification is provided to the remote user. The return call data directory 26 is preferably stored in non-volatile memory such as Flash memory.

The telephone answering device 10 further includes a notification message 45, stored in non-volatile memory such as Flash memory, which is played to the user at a designated remote location 49 upon their answering a notification telephone call automatically dialed from the telephone answering device 10.

The designated remote location 49 in the disclosed embodiment is a non-volatile memory (e.g., Flash memory) location storing the digits of a telephone number to be dialed to locate the remote user. The user may change the telephone number stored in the remote notification designation 49 as desired, either using the keypad 32 upon prompting by the controller 24 using the display 47, or using an alphanumeric keypad of a remote telephone upon establishment of a telephone call with the telephone answering device 10.

The telephone answering device 10 of the present invention further includes a controller 24, which may be any suitable processor, e.g., microprocessor, microcontroller, or digital signal processor (DSP).

The controller 24 may include a DTMF decoder 22 to allow remote control of the telephone answering device 10 from a remote telephone over an established telephone connection.

The DTMF decoder 22, calling module 28, and/or return call data directory 26 can be integrated within program code of the controller 24, and/or external or separate from the controller 24 but nevertheless in communication with the controller 24.

In the disclosed embodiment, the user is notified over the public switched telephone network (PSTN) using the auto dialing calling module 28 based on the occurrence of one or more predetermined events defined by the user in an entry in the return call data directory 26. Although the disclosed auto dialing calling module 28 is capable of automatically dialing a telephone number and of allowing the subsequent establishment of a telephone call with the called telephone equipment, it is within the principles of the present invention to include additional protocols in the auto dialing calling module 28 as necessary to allow communication over more sophisticated mediums, e.g., over the Internet, over a paging system, using e-mail, etc. For instance, the auto dialing calling module 28 may include the necessary protocols (e.g., TCP/IP) to send a digitized form of the notification message to the user at the designated remote location 49 using the Internet.

In accordance with the principles of the present invention, the telephone answering device notifies the user or other designated party at a predetermined remote location 49, e.g., using a telephone number (or web site or e-mail address), and plays (or provides in textual form) a pre-recorded notification message 45 notifying the user that a predetermined event at their telephone answering device has occurred. After listening to the notification message 45, the user would then take over remote control of their voice messaging system (e.g., their telephone answering device) and retrieve their voice messages.

The pre-recorded notification message provided to the user may include synthesized information relating to the specific event which has occurred, or textual information either directly by the user through the keypad 32 or using a conventional voice-to-text converter implemented in the controller 24.

For instance, a general, pre-recorded notification message may be pre-recorded by the user, stored as the notification message 45, and later played. An example message is: "This is an automatic notification requested from your voice messaging system."

A text-to-voice type voice synthesis may additionally or alternatively be provided by the telephone answering device 10 to the remote user with a synthesized audible message such as: "Event number five has been satisfied." Alternatively, or additionally, the user may query the voice messaging system (e.g., telephone answering device 10) to determine the particular call related information (e.g., telephone number and/or household name) which has caused the event to be satisfied.

Using the automatic notification of a specific event in accordance with the principles of the present invention, the user will benefit from the typically lower toll rates with a call made from their home or office to the remote location (rather than from the remote location to their home or office). Moreover, the user can save time by not having to continually call their voice messaging system to retrieve any voice messages which might have been left.

The remote notification designation 49 can be programmed by the user either when local to the telephone answering device 10 or through remote communications therewith. Similarly, entries in the return call data directory 26 can be added, deleted, or modified by the user through remote or local programming.

The notification can result from the addition of call related information relating to a particular caller or callers into the call related information log 39, or on a total number of entries in the call related information log 39, a number of entries added over a predetermined period of time, etc., all based on received call related information stored in the call related information log 39.

In accordance with the principles of the present invention, the user will be notified regarding calls to their voice messaging system whether or not the calling party left a voice message. Thus, the remote user can be notified regarding information which is not available from a conventional retrieval of voice messages from a voice messaging system.

The auto dialing calling module 28 notifies the user or other party designated in the remote notification designation 49 after a triggering entry is added to the call related information log 39. Preferably the controller 24 analyzes the contents of the call related information log 39 during a quite period after each new entry therein, and activates the auto dialing calling module 28 upon satisfaction of any specific criteria defined in the return call data directory 26. Upon disconnection of the calling party subsequent to leaving a voice message, the auto dialing calling module 28 of the telephone answering device 10 allows a dial tone from the central office 14 to be presented to the telephone answering device 10. The telephone answering device 10 then dials out to the pre-stored predetermined telephone number using the DTMF generator 28a, waits for the called party to answer, and then provides the notification message 45, e.g., by audibly playing a pre-recorded notification message to the user or other designated party presumed to have answered the telephone call.

The calling module 28 is preferably a software module included within the program code of the controller 24. Of course, the calling module 28 can be implemented separate from the controller 24, but regardless, will preferably be in communication with the controller 24.

Entries in the return call data directory 26 can be pre-stored by the user of the telephone answering device 10. In particular, to pre-store entries in the return call data directory 26, the telephone consumer can be prompted by an appropriate application program running in the controller 24 to associate particular Caller ID information, e.g., a telephone number, name, etc., to a particular call back telephone number.

The database of the return call data directory 26 can alternatively be downloaded from the telephone company central office 14, e.g., upon installation of the telephone answering device 10 and/or when instructed by the telephone consumer. In this case, a modem may be included in the telephone answering device 10 to receive data from another modem at the telephone company central office 14. Ideally, a special telephone number would be dialed at the telephone answering device 10 to establish a connection to a modem at the telephone company central office 14 associated with that special notification telephone number.

Alternatively, the return call data directory 26 and/or the calling module 28 can be maintained at the telephone company central office 14. In this case, the telephone company central office 14 would determine the Caller ID information and initiate a call back of the user or other designated party. The return call data directory 26 can be updated on a more frequent periodic or occasional basis if it is installed at the telephone company central office 14.

Furthermore, the telephone consumer can modify the entries in the return call data directory 26 by simply calling a designated telephone number at the telephone company central office 14 and adding or deleting entries via instruction to the controller 24 through the keypad 32 of the telephone answering device 10.

Deactivation of the auto dialing calling module 24 may be allowed by inclusion of a dedicated button on the telephone answering device 10.

FIG. 2 illustrates an exemplary list of entries 202-212 and 218 in the database of the return call data directory 26 after programming by the telephone consumer.

In particular, each of the entries in the exemplary embodiment associate particular call related information (e.g., a telephone number) to a particular event, and a separate telephone number to be notified (or the default stored in the remote notification designation 49) in the event that the event becomes satisfied. In the exemplary embodiment, the event is the number of times that the particular call related information 220 is matched in the call related information log 39.

For instance, in the first entry 202, after one call is received from 888-555-1212, the notification message 45 is sent to 888-555-1414 under the control of the auto dialing calling module 28 when the telephone answering device 10 is otherwise not in use.

A second entry 204 and the sixth entry 212 are in a deactivated state wherein no notification is provided. The second entry 204 and sixth entry 212 remain in the return call data directory 26 to provide ease for reestablishment of the entry at a time in the future.

The third entry 206 provides notification to 888-555-1515 after 'Smith' calls twice. The fourth and fifth entries 208-210 provide notification to the default remote notification designation 49 upon a single entry in the call related information log 39.

The last entry 218 is a default condition defining an event wherein notification is provided to 888-555-1234 after ten entries from any calling party all within one hour are entered in the call related information log 39.

Other parameters may be included with each entry 202-218. For instance, an urgency may be designated for notification within, e.g., 10 minutes, 20 minutes, etc., and appropriate action taken by the controller 24 and/or auto dialing calling module 28.

Figure 3:
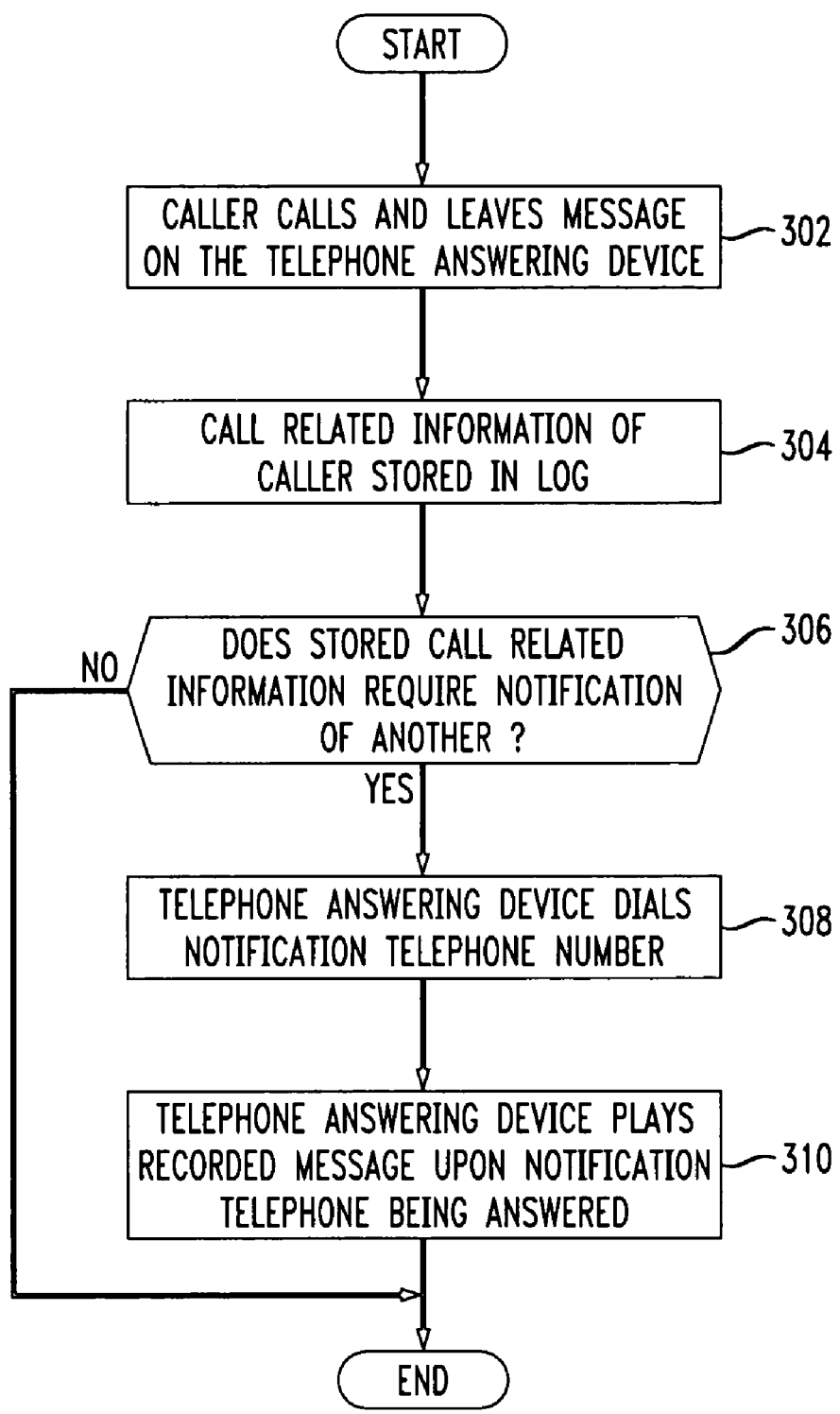
FIG. 3 is a flow chart illustrating an exemplary process by which the telephone answering device of FIG. 1 notifies a user or other designated party upon analysis of call related information, in accordance with the principles of the present invention.
Figure 4:
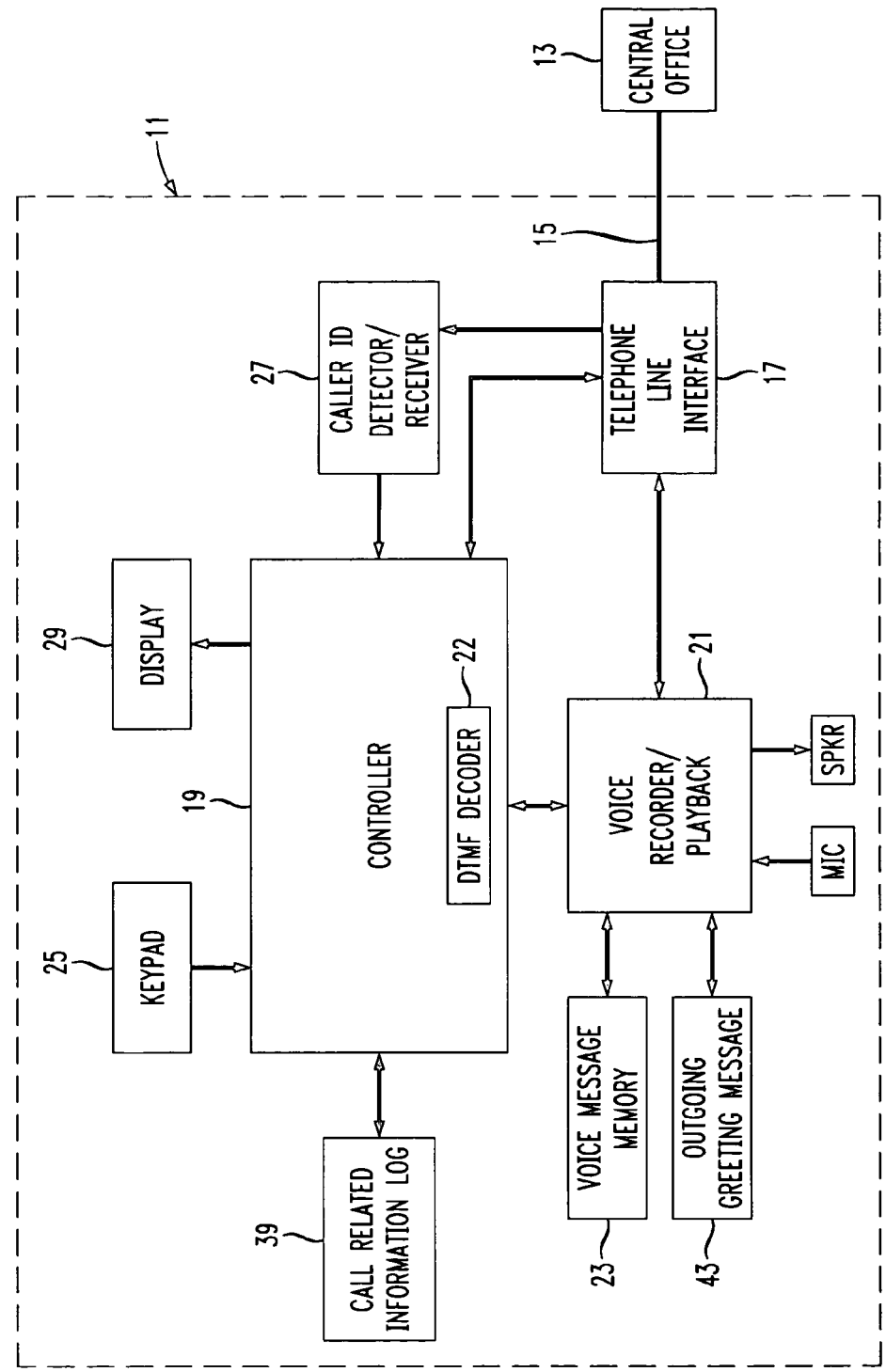
FIG. 4 illustrates a conventional telephone answering device.

FIG. 3 illustrates an exemplary flow chart showing the process by which the telephone answering device 10 of FIG. 1 notifies the user or other designated party at a designated, predetermined telephone number upon the occurrence of a qualifying event.

In particular, with reference to FIG. 3, in step 302, the calling party calls the user's assigned telephone number of the telephone line 16. Whether or not a voice message is left, an appropriate entry is logged in the call related information log 39 as shown in step 304.

In decision step 306, the controller 24 determines whether or not a qualifying event indicated by the entries in the return call data directory 26 has occurred. If no qualifying event has occurred, the process ends. However, if a notification qualifying event is determined by the controller 24, e.g., if the designated number of matches are found in a predetermined number of entries in the call related information log 39 over the designated period, the controller 24 activates the auto dialing calling module 28 to initiate a notification of the user at the designated telephone number (i.e., as designated in the matched event entry in the return call data directory 26 or as indicated in the remote notification designation 49.

In step 308, the telephone answering device 10 notifies the user or other designated party by dialing the notification telephone number.

In step 310, upon answering of the notification telephone call to the user at the designated remote location, the telephone answering device 10 plays or otherwise provides the notification message 45.

Although the described embodiments relate to the implementation of an auto dialing calling module, return call data directory and notification message in a voice messaging system such as a telephone answering device, the principles of the present invention relate equally to the implementation of an auto dialing calling module, return call data directory and/or notification message implemented at the telephone company central office 14.

While the invention has been described with reference to the exemplary embodiments thereof, those skilled in the art will be able to make various modifications to the described embodiments of the invention without departing from the true spirit and scope of the invention.

What is claimed is:

1. A notification module for a voice messaging system, comprising:
    a Caller ID information detector/receiver to detect and receive Caller ID information, which is provided by a telephone company via a service, regarding incoming telephone calls;
    an auto dialing calling module adapted to initiate a communication with a user at a remote location;
    a user defined table associating particular events with a need for notification of said user; and
    a controller to activate said auto dialing calling module to automatically send a notification message to said user upon satisfaction of a particular event based on Caller ID information and based on receipt of at least two telephone calls selecting from a particular caller or a group of callers within a predetermined range of time as defined by one or more entries in said user defined table.

2. The notification module for a voice messaging system according to claim 1, wherein:
    said particular events include a occurrence of a predetermined number of telephone calls from a particular caller.

3. The notification module for a voice messaging system according to claim 1, further comprising:
    a notification message to be communicated to said remote user.

4. The notification module for a voice messaging system according to claim 3, wherein:
    said notification message is an audible message.

5. The notification module for a voice messaging system according to claim 3, wherein:
    said notification message is a textual message.

6. The notification module for a voice messaging system according to claim 1, further comprising:
    a remote notification designation identifying a communication address of said remote user.

7. The notification module for a voice messaging system according to claim 6, wherein:
    said communication address is a telephone number of said remote user.

8. The notification module for a voice messaging system according to claim 7, wherein:
    said communication is provided by establishment of a telephone call.

9. The notification module for a voice messaging system according to claim 7, wherein:
    said communication includes transmission of information over the Internet.

10. The notification module for a voice messaging system according to claim 7, wherein:
    said communication is an email message.

11. The notification module for a voice messaging system according to claim 7, wherein:
    said voice messaging system is a telephone answering device.

12. A method for notifying a user of a voice messaging system or other designated party upon satisfaction of a predetermined event based on logged call related information regarding incoming calls, comprising:
    logging a plurality of entries of Caller ID information, which is provided by a telephone company via a service, as it is received by said voice messaging system;
    after said plurality of entries of Caller ID information have been received, reviewing said plurality of entries of logged Caller ID information for satisfaction of a predetermined event by one or more of said incoming calls based on receipt of at least two telephone calls selecting from a particular caller or a group of callers within a predetermined range of time; and
    automatically calling a remote user with a notification message in response to satisfaction of said predetermined event.

13. The method for notifying a user of a voice messaging system or other designated party upon satisfaction of a predetermined event based on logged call related information regarding incoming calls according to claim 12, wherein:

said remote user is notified by the establishment of a telephone call from said voice message system.

14. The method for notifying a user of a voice messaging system or other designated party upon satisfaction of a predetermined event based on logged call related information regarding incoming calls according to claim 12, wherein:

said remote user is notified with an audible notification message.

15. The method for notifying a user of a voice messaging system or other designated party upon satisfaction of a predetermined event based on logged call related information regarding incoming calls according to claim 12, wherein:

said remote user is notified with a textual notification message.

16. The method for notifying a user of a voice messaging system or other designated party upon satisfaction of a predetermined event based on logged call related information regarding incoming calls according to claim 12, wherein:

said textual notification message is an email message.

17. The method for notifying a user of a voice messaging system or other designated party upon satisfaction of a predetermined event based on logged call related information regarding incoming calls according to claim 12, wherein:

said voice messaging system is a telephone answering device.

18. Apparatus for notifying a user of a voice messaging system or other designated party upon satisfaction of a predetermined event based on logged call related information regarding incoming calls, comprising:

means for logging a plurality of entries of Caller ID information, which is provided by a telephone company via a service, as it is received by said voice messaging system;

means for reviewing, after said plurality of entries of Caller ID information have been received, said plurality of entries of logged Caller ID information for satisfaction of a predetermined event by one or more of said incoming calls based on receipt of at least two telephone calls selecting from a particular caller or a group of callers within a predetermined range of time; and means for automatically notifying a remote user with a notification message in response to satisfaction of said predetermined event.

19. A telephone answering device comprising:

a Caller ID information detector/receiver to detect and receive Caller ID information, which is provided by a telephone company via a service, regarding incoming telephone calls;

a controller;

a voice recorder/playback module; and a calling module activated by receipt of predetermined Caller ID information, said calling module being adapted to automatically initiate a telephone call to a predetermined notification telephone number upon satisfaction of a predetermined event and based on receipt of at least two telephone calls selecting from a particular caller or a group of callers within a predetermined range of time, to notify a remote user with a notification message.

20. The telephone answering device according to claim 19, wherein:

said calling module is further adapted to provide a notification message to a party answering said predetermined notification telephone number.

21. A notification module for a voice messaging system, comprising:

a Caller ID information detector/receiver to detect and receive Caller ID information, which is provided by a telephone company via a service, regarding incoming telephone calls;

an auto notification module adapted to initiate a communication with a user at a remote location;

a user defined table associating particular events with a need for notification of said user; and a controller to activate said auto notification module to automatically send a notification message to said user upon satisfaction of a particular event based on Caller ID information indicating receipt of at least two telephone calls selecting from a particular caller or a group of callers within a predetermined range of time, said notification message being communicated via an Internet.

22. The notification module for a voice messaging system according to claim 21, wherein:

said notification message communicated via said Internet is an email message.

23. The notification module for a voice messaging system according to claim 21, wherein:

said notification message is an audible message.

24. The notification module for a voice messaging system according to claim 21, wherein:

said notification message is a textual message.

* * * * *